H. G. Terwilliger,
Grooving Chisel.
No. 100,690.  Patented Mar. 8, 1870.
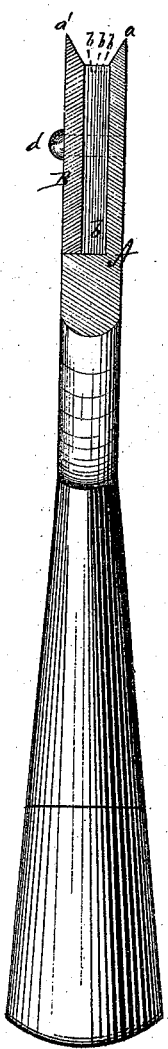
Witnesses
J. Lehmann
C. L. Evert
Inventor.
H. G. Terwilliger
per
Crander & Mason
attys.

United States Patent Office.

H. G. TERWILLIGER, OF SCRANTON, PENNSYLVANIA.

Letters Patent No. 100,690, dated March 8, 1870; antedated February 28, 1870.

IMPROVEMENT IN GROOVING-CHISEL.

The Schedule referred to in these Letters Patent and making part of the same.

*To all whom it may concern:*

Be it known that I, H. G. TERWILLIGER, of Scranton, in the county of Luzerne, and in the State of Pennsylvania, have invented certain new and useful Improvements in Grooving-Chisels; and do hereby declare that the following is a full, clear, and exact description thereof, reference being had to the accompanying drawings and to the letters of reference marked thereon making a part of this specification.

The nature of my invention consists in the construction of a "grooving-chisel," so that it can be changed or adjusted to any size of work required.

In order to enable others skilled in the art to which my invention appertains to make and use the same, I will now proceed to describe its construction and operation, referring to the annexed drawings, which represent an edge view of my chisel.

A represents the body part of the chisel, one side of which is extended and has the cutting-edge $a$ at its outer end, leaving at the base of this extended side a square shoulder, on which is placed a number of metal plates $b\ b$.

On the outer side of the plates $b\ b$ is placed a chisel-blade, B, corresponding in size and shape with the extended side of the main chisel A, and having a cutting-edge, $a'$, at its outer end.

The blade B is secured by screws $d$ to the extended chisel A, said screws passing through the plates $b\ b$.

It will readily be seen that by placing a greater or lesser number of plates between the chisel blades, the cutting-edges of said blades will be brought further apart or closer together, and consequently any-sized grooves may be cut with the same chisel.

Having thus fully described my invention,

What I claim as new, and desire to secure by Letters Patent, is—

In combination with a chisel, A, the movable blade B, held at any desired distance from the chisel A by the plates $b\ b$, and held in position by the screws $d$, substantially as and for the purposes herein set forth.

In testimony that I claim the foregoing I have hereunto set my hand this 22d day of July, 1869.

H. G. TERWILLIGER.

Witnesses:
 C. L. EVERT,
 H. K. GRANT.